United States Patent [19]

Nowak et al.

[11] 4,194,955

[45] Mar. 25, 1980

[54] ULTRAVIOLET CURABLE SELF-PIGMENTED COATING COMPOSITION

[75] Inventors: Michael T. Nowak, Westfield; Charles B. Rybny, Somerset, both of N.J.

[73] Assignee: Celanese Corporation, New York, N.Y.

[21] Appl. No.: 960,203

[22] Filed: Nov. 13, 1978

[51] Int. Cl.² .......................... C08F 8/00; C08F 2/50; C08G 2/02
[52] U.S. Cl. .................... 204/159.15; 204/159.11; 204/159.18; 204/159.21; 427/44; 428/436; 428/44.2; 428/460; 428/461
[58] Field of Search ................. 204/159.11, 159.15, 204/159.21, 159.18; 427/44, 54; 260/885

[56] References Cited

U.S. PATENT DOCUMENTS

| | | | |
|---|---|---|---|
| 3,907,656 | 9/1975 | deSooza | 204/159.16 |
| 3,993,798 | 11/1976 | Brose et al. | 427/44 |
| 4,005,244 | 1/1977 | Wismer et al. | 428/480 |
| 4,054,498 | 10/1977 | Tarwid | 204/159.11 |
| 4,118,366 | 10/1978 | Brose et al. | 260/40 R |

*Primary Examiner*—Richard B. Turer
*Attorney, Agent, or Firm*—Kenneth A. Genoni

[57] ABSTRACT

This invention provides a substantially transparent curable coating composition which upon curing with ultraviolet radiation converts into a glossy opaque film.

The invention ultraviolet radiation curable coating composition comprises a homogeneous blend of (1) polyvinyl butyral, (2) vinyl acetate, (3) trimethylolpropane triacrylate and/or pentaerythritol triacrylate, and (4) a photoinitiator.

3 Claims, No Drawings

ULTRAVIOLET CURABLE SELF-PIGMENTED COATING COMPOSITION

BACKGROUND OF THE INVENTION

Ultraviolet curable coating compositions are well known in the art. Their use has been increasing rapidly in recent years because of coating industry efforts to reduce polluting effluents. Another major concern has been a reduction in the amount of energy required to ultimately cure the coatings to the desired degree of crosslinking. In non-pigmented coatings (clears) cure response has not been a problem in most instances apparently because clear coatings allow substantial through-and-through penetration of the film by the ultraviolet light. However, with pigmented coatings a different problem has become apparent, particularly with white, titanium dioxide-based coatings. In these instances, cure response properties have in many cases been so reduced that the coating did not cure below the surface leaving a non-cured liquid subsurface, or the coating remained soft and tacky. For this reason, there has been continuing development effort to provide new coating systems which minimize pollution problems and which are less energy-intensive.

U.S. Pat. No. 3,642,672 describes a polyester resin composition which cures under heat and pressure to form a rigid product which is characterized by an optically heterogeneous appearance. The composition comprises a thermoplastic cellulose ester, an unsaturated polyester, and a polymerizable monomer.

U.S. Pat. No. 3,907,656 describes a process in which the cure of a paint film having a binder that is polymerizable by irradiation is improved by providing entrapped opacifying gas bubbles within the paint film. The opacifying entrapped gas bubbles permit the use of less opacifying pigment such as titania. The film contains granules which entrap preformed opacifying gas bubbles. Optical opacity is achieved either by absorption of the incident light or by scattering of the incident light, or by a combination thereof.

U.S. Pat. No. 3,984,584 describes the production of opaque coatings and films with compositions which contain (1) photosensitized light curing condensation resins having double bond values of 0.18 to 0.45; ((2) fillers having low covering capacity; (3) film forming cellulose derivatives or vinyl chloride copolymers; and (4) a non-reactive solvent.

U.S. Pat. No. 3,993,798 describes a cured opaque coating with high hiding power produced from a normally transparent polyester paste filler composition. The composition consists essentially of unsaturated polyester, copolymerizable monomer, sensitizer, accelerator, non-reactive solvent and plasticizer, and filler material of low hiding power.

U.S. Pat. No. 4,005,244 describes an ultraviolet light curable coating composition comprising an ultraviolet curable component which shrinks upon curing, a non-curable component, and a photoinitiator. As the composition is cured by exposure to ultraviolet light, the curable component and the non-curable component phase separate and dentritic microfractures appear at phase boundries to provide opacity to the cured coatings.

There remains a need for new and improved ultraviolet light curable coating systems which satisfy more stringent pollution standards and energy conservation measures.

Accordingly, it is an object of this invention to provide a coating composition which is curable under minimal application of ultraviolet radiation.

It is another object of this invention to provide a low viscosity coating composition which is ultraviolet radiation curable as a 100 percent solids system.

It is a further object of this invention to provide a substantially transparent non-pigmented coating composition which is ultraviolet curable to a glossy white opaque enamel film on a substrate.

Other objects and advantages of the present invention shall become apparent from the accompanying description and examples.

DESCRIPTION OF THE INVENTION

One or more objects of the present invention are accomplished by the provision of an ultraviolet radiation curable coating composition comprising a homogeneous blend of (1) polyvinyl butyral, (2) vinyl acetate, (3) polymerizable monomer selected from trimethylolpropane triacrylate and pentaerythritol triacrylate, and (4) a photoinitiator.

Before it is cured by exposure to ultraviolet radiation, a typical curable coating composition of the present invention is a transparent low viscosity liquid medium which is transmissive of both visible and ultraviolet light.

After it has been coated on a substrate and cured by exposure to ultraviolet radiation, the invention composition has the appearance and properties of a hard glossy, white opaque-enamel film. The optical opacity of the cured coating has excellent hiding power and a high level of whitening effect, which is indicative of low absorption and maximum scattering of incident light.

In a preferred embodiment this invention provides a light-transmissive coating composition which is ultraviolet radiation curable to a white opaque film comprising (1) between about 5 and 20 weight percent of polyvinyl butyral, (2) between about 35 and 45 weight percent of vinyl acetate, (3) between about 35 to 45 weight percent of polymerizable monomer selected from trimethylolpropane triacrylate and pentaerythritol triacrylate, and (4) between about 1 and 10 weight percent of an ultraviolet-sensitive photoinitiator.

The presence of the polyvinyl butyral component is an essential feature of a present invention coating composition. Polyvinyl butyral appears to be unique in the ability to impart optical opacity to the type of coating systems described herein. As demonstrated in Example III, either no optical opacity or a low level of optical opacity is imparted by a broad variety of resins which were screened as a coating composition component in comparison with polyvinyl butyral. It is to be noted additionally that polyvinyl formal is also unsatisfactory as an optical opacifier in comparison with polyvinyl butyral.

In the preparation of a present invention coating composition, it is preferred that the polyvinyl butyral resin component has an average molecular weight in the range between about 10,000 and 50,000, and most preferably in the range between about 30,000 and 40,000. Further, it is preferred that the free hydroxyl content is less than about 15 weight percent, calculated as weight percent of polyvinyl alcohol.

Polyvinyl butyral of 34,000–38,000 average molcular weight is a white free-flowing powder. The viscosity of a 15 percent solution in 60:40 toluene/ethanol is about 100–200 cps when measured at 25° C. with a Brookfield Viscometer.

Another important feature of a present invention coating composition is the presence of vinyl acetate as a first polymerizable composition component, and the presence of trimethylolpropane and/or pentaerythritol triacrylate as a second polymerizable component.

As demonstrated in Example I and Table I, even when polyvinyl butyral is a composition component, optical opacity is not achieved if vinyl acetate is not a component, or if trimethylolpropane triacrylate and/or pentaerythritol triacrylate is not a component. Hence, vinyl pyrrolidone or styrene cannot be substituted for vinyl acetate, and tetraethylene glycol diacrylate or trimethylolethane triacrylate cannot be substituted for trimethylolpropane triacrylate and/or pentaerythritol triacrylate.

Another feature of a present invention coating composition is the presence of an ultraviolet-sensitive photoinitiator. A conventional photoinitiator is suitable for incorporation in a present invention ultraviolet radiation curable coating composition. While not preferred, in lieu of the chemical free radical photoinitiators, high energy ionizing particle irradiation, high energy ionizing electromagnetic radiation or actinic light may be employed as a source of radicals.

The photoinitiator component is employed in a quantity between about 0.5 and 15 weight percent, based on total composition weight. The preferred quantity of photoinitiator will usually average in the range between about 1 and 10 weight percent.

The photoinitiator component is selected to provide fast cure response when the curable resin coating composition is exposed to low energy activation from a light source having a wavelength in the range between about 2000 and 6000 angstroms. Suitable light sources are sunlamps, mercury arcs, carbon arcs, tungsten filament lamps, xenon arcs, krypton arcs, and the like. The preferred resin compositions of this invention are curable in less than about 5 seconds when irradiated with ultrviolet light at room temperature. The radiation emitting source is preferably within about twelve inches of the coating surface being cured.

The photoinitiator component can be added as a single compound or a mixture of compounds. Illustrative of suitable photoinitiator compounds are those disclosed in Chemical Reviews, 68 (No. 2), 125 (1968), and in U.S. Pat. Nos. 3,840,390; 3,864,133; and the like. Typical photoinitiator compounds include acyloin and derivatives thereof, such as benzoin, benzoin methyl ether, benzoin ethyl ether, benzoin isopropyl ether, benzoin isobutyl ether, desyl bromide, and α-methylbenzoin; diketones such as benzil and diacetyl, etc.; organic sulfides such as diphenyl monosulfide, diphenyl disulfide, desyl phenyl sulfide, and tetramethylthiuram monosulfide; S-acyl dithiocarbamates, such as S-benzoyl-N,N-dimethyldithiocarbamate and S-(p-chlorobenzoyl)-N,N-dimethyldithiocarbamate; phenones such as acetophenone, α,α,α-tribromoacetophenone, o-nitro-α,α,α-tribromoacetophenone, benzophenone, and p,p-tetramethyldiaminobenzophenone; sulfonyl halides such as p-toluenesulfonyl chloride; and the like.

If desired, an amine can also be incorporated in the invention curable resin composition to accelerate the rate of curing by light radiation when the photoinitiator is an aryl ketone. Amines that exhibit this synergistic rate-enhancing effect include triethanolamine, tributylamine, triethylamine, and the like.

As an optical feature, a stabilizer component can be included in the coating composition. The stabilizer component can be a single compound or a mixture of compounds, and can be selected from the broad variety of compounds known in the art for stabilizing coating formulations to the action of heat and light.

The various types of stabilizer compounds include barium, cadmium and zinc soaps and phenates, basic lead compounds, organo-tin compounds such as dialkyl tin mercaptides and dialkyltin maleates, thiolauric anhydride and n-butyl stannoic acid, epoxidized oil, alkyl diphenyl phosphites, triaryl phosphites, phenyl salicylates, benzophenones and benzotriazoles, and the like. Other stabilizer compounds known and used in the art are listed in U.S. Pat. Nos. 2,510,035; 3,200,093; 3,485,788; 3,940,355; 3,944,717; and the like. An additional listing is set forth in "Polyvinyl Chloride", H. A. Sarvetnick; Van Nostrand Reinhold Co., New York, N. Y., (1969).

The quantity of stabilizer component employed in a present invention coating composition will usually vary in the range between about 0.5 and 5 weight percent, based on total composition weight. On the average the quantity of stabilizer will vary in the range between about 1 and 4 weight percent. Employing a combination of stabilizer compounds (e.g., a tin compound and a thiuram sulfide compound) is advantageous since the combination appears to impart a synergistic enhancement of stabilizer effect.

Another optional ingredient for inclusion in a coating composition is an extender pigment which is generally transparent to both ultraviolet and visible light. Examples of suitable extender pigments are finely divided particles of silica, barytes, calcium carbonate, talc, magnesium, silicate, aluminum silicate, etc. The extender pigments do not ordinarily provide significant additional hiding, but they accelerate the rate at which opacity is obtained. Extender pigment is generally present in an amount in the range of from about 0 to about 40 percent by weight of the coating composition. An amount in the range of from about 0 to about 15 percent is most often preferred.

A present invention ultraviolet radiation curable coating composition is readily prepared by the simple expediency of blending and dissolving the composition components together at room temperature with stirring until a homogeneous solution is obtained.

The coating of substrates with an invention coating composition is accomplished by conventional application techniques such as spraying, dipping, curtain and roll coating, and the like.

Substrates which may be coated with a composition of this invention may vary widely in their properties. Organic substrates such as wood, fiberboard, particle board, composition board, paper, cardboard and various polymers such as polyesters, polyamides, cured phenolic resins, cured aminoplasts, acrylics, polyurethanes and rubber may be used. Inorganic substrates are exemplified by glass, quartz and ceramic materials. Many metallic substrates may be coated. Exemplary metallic substrates are iron, steel, stainless steel, copper, brass, bronze, aluminum, magnesium, titanium, nickel, chromium, zinc, and alloys.

The coated substrate is exposed to electromagnetic radiation having a wavelength above about 2000 angstroms and up to about 6000 angstroms. The optimal exposure time will vary, depending on such factors as film thickness, temperature, radiation power and the like. Generally, with a mercury vapor radiation power of about 200 watts per linear inch set at a distance of 12 inches from the coating surface, a present invention curable resin coating will cure within about 0.1–0.25 seconds.

While not being bound by any theory or mechanism of optical opacity formation in the ultraviolet radiation cured coating film, electron microscopy would seem to indicate that the whitening effect (i.e., the scattering of incident light) is due to the presence of insoluble beads of polyvinyl butyral in the thermoset crosslinked matrix of polymerized vinyl acetate and trimethylolpropane triacrylate and/or pentaerthyritol triacrylate components.

In addition to having a glossy white enamel appearance, a present invention cured coating composition exhibits excellent resistance to solvents and corrosive chemicals. Example II illustrates the resistance of an ultraviolet radiation cured coating composition to the action of solvents such as ethanol and methyl ethyl ketone, and to the action of chemicals such as sulfuric acid and sodium hydroxide.

The following examples are further illustrative of the present invention. The reactants and other specific ingredients are presented as being typical, and various modifications can be devised in view of the foregoing disclosure within the scope of the invention.

EXAMPLE I

This Example illustrates the production of present invention white opaque coatings in comparison with coatings not in accordance with this invention.

The ingredients listed in Table I were formulated into coating compositions and cast on glass at the film thicknesses indicated, and then ultraviolet radiation cured by 3 passes at 20 fpm under a 200 watt/inch medium pressure mercury lamp in air.

Compositions 3 and 4 in accordance with the present invention cured to glossy opaque coatings at film thicknesses of 3 and 6 mils. Compositions not in accordance with this invention cured to glossy transparent coatings at all three film thicknesses.

EXAMPLE II

This Example illustrates the chemical resistance properties of a present invention ultraviolet radiation cured coating compotion.

The composition listed in TABLE II was prepared and coated on an aluminum substrate in a 6 1 mil thickness, and cured by 5 passes at 100 fpm under a 200 watt/inch medium pressure mercury lamp in air.

TABLE II

| Chemical Resistance Properties | | |
|---|---|---|
| Composition | 7 | 8 |
| Polyvinyl butyral (B-79, Monsanto) | 10 | 10 |
| Vinyl acetate | 40 | 40 |
| Microlith Blue 4GT (Ciba-Geigy) | 5 | — |
| Trimethylolpropane triacrylate | 40 | 40 |
| Benzoin ethyl ether | 9 | 9 |
| Dibutyl tin maleate | 1 | 1 |

| Films cured on aluminum at 6 mil, 5 passes at 100 fpm. | | |
|---|---|---|
| Chemical Resistance (24 hrs.) | 7 | 8 |
| 10% Sulfuric acid | no effect | no effect |
| 10% Sodium hydroxide | no effect | no effect |
| 10% Acetic acid | no effect | no effect |
| Ethyl Alcohol | slight swelling | slight swelling |
| Methyl ethyl ketone | slight swelling | slight swelling |
| Merthiolate | etched | etched |

EXAMPLE III

This Example illustrates a screening of coating compositions not in accordance with the present invention.

These coating compositions differ from a present invention coating composition in that the polyvinyl butyral resin component has been replaced by a different kind of resin component.

The resins listed in TABLE III are supplied by the companies indicated below.

| | |
|---|---|
| Pliolite HML, Goodyear | Unirez 7003, Union Camp |
| Pliolite VTL, Goodyear | RJ-100, Monsanto |
| Pliolite S5A, Goodyear | 18-290, Amoco |

TABLE I

| | Variation in Multifunctional Monomer | | | | | |
|---|---|---|---|---|---|---|
| Composition | 1 | 2 | 3 | 4 | 5 | 6 |
| Polyvinyl butyral (B-79 Monsanto) | 10 | 10 | 10 | 10 | 10 | 10 |
| Vinyl Acetate | — | — | 40 | 40 | 40 | 40 |
| Vinyl pyrrolidone | 40 | — | — | — | — | — |
| Styrene | — | 40 | — | — | — | — |
| Trimethylolpropane triacrylate | 40 | 40 | 40 | — | — | — |
| Pentaerythritol triacrylate | — | — | — | 40 | — | — |
| Tetraethylene glycol diacrylate | — | — | — | — | 40 | — |
| Trimethylolethane triacrylate | — | — | — | — | — | 40 |
| Benzoin ethyl ether | 9 | 9 | 9 | 9 | 9 | 9 |
| Dibutyl tin maleate | 1 | 1 | 1 | 1 | 1 | 1 |
| Solution Clarity | Clear | No Solution | Clear | Clear | Clear | Clear |
| Whitening Effect | | | | | | |
| 6 mils | no | — | yes | yes | no | no |
| 3 mils | no | — | yes | yes | no | no |
| 1 mil | no | — | no | no | no | no |
| Whitening Index[1] | | | | | | |
| 6 mils | — | — | 94.3 | 83.2 | — | — |
| 3 mils | — | — | 84.0 | 72.2 | — | — |
| 1 mil | — | — | — | — | — | — |

[1] Whitening Index refers to L scale measurements on a Hunter Associates Lab. Color/Difference Meter D25D2.

-continued

| | |
|---|---|
| Pliolite S5E, Goodyear | Pentalyn K, Hercules |
| Chlorowax 70, Diamond Shamrock | N/C ¼"RS, Hercules |
| Acryloid B-16, Rohm and Haas | SMA 1000A, Arco |
| Parlon S-5, Hercules | 50-42, Dupont |
| Vitel PE-100, Union Carbide | EPON 1001, Shell |
| Vitel PE-200, Union Carbide | Estane 5715, Goodrich |
| AYAC, Union Carbide | Estane 5703, Goodrich |
| VMCC, Union Carbide | Estane 5707F-1, Goodrich |
| QYOH, Union Carbide | Estane 5714F-1, Goodrich |
| Saran F-310, Dow | Estane 5603F-2, Goodrich |

It is to be noted that almost all of the coating compositions screened did not cure to an opaque film.

Several of the coating compositions cured with some degree of opaqueness, e.g., some of the compositions which contained styrene-butadiene, vinyltoluene-butadiene, styrene-acrylate, polyacrylate, chlorinated rubber or polyvinyl acetate as the resin component.

None of the opaque films produced by the above indicated coating compositions exhibited the high degree of whiteness characteristic of a cured film of a present invention coating composition which contain polyvinyl butyral as the non-polymerizable resin component. The whiteness of a present invention cured coating composition is comparable in appearance to that of a titania-containing enamel.

TABLE III

| Composition | 9 | 10 | 11 | 12 | 13 | 14 | 15 | 16 | 17 | 18 |
|---|---|---|---|---|---|---|---|---|---|---|
| Pliolite HML (styrene-acrylate) | 10 | 30 | — | — | — | — | — | — | — | — |
| Pliolite VTL (vinyl-toluene-butadiene) | — | — | 10 | 30 | — | — | — | — | — | — |
| Pliolite ACL (styrene-acrylate) | — | — | — | — | 10 | 30 | — | — | — | — |
| Pliolite S5A (styrene-butadiene) | — | — | — | — | — | — | 10 | 30 | — | — |
| Pliolite S5E (styrene-butadiene) | — | — | — | — | — | — | — | — | 10 | 30 |
| Chlorowax 70 (chlorinated paraffin, 70%) | — | — | — | — | — | — | — | — | — | — |
| Acryloid B-66 (acrylic) | — | — | — | — | — | — | — | — | — | — |
| Parlon S-5 (chlorinated rubber) | — | — | — | — | — | — | — | — | — | — |
| Vitel PE-100 (polyester) | — | — | — | — | — | — | — | — | — | — |
| Vitel PE-200 (polyester) | — | — | — | — | — | — | — | — | — | — |
| AYAC (polyvinyl acetate) | — | — | — | — | — | — | — | — | — | — |
| VMCC (polyvinyl chloride) | — | — | — | — | — | — | — | — | — | — |
| QYOH (polyvinyl chloride) | — | — | — | — | — | — | — | — | — | — |
| Saran F-310 (polyvinylidene chloride) | — | — | — | — | — | — | — | — | — | — |
| Unirez 7003 (maleic rosin ester) | — | — | — | — | — | — | — | — | — | — |
| RJ-100 (styrene-allyl alcohol) | — | — | — | — | — | — | — | — | — | — |
| 18-290 (polystyrene) | — | — | — | — | — | — | — | — | — | — |
| Pentalyn K (rosin ester) | — | — | — | — | — | — | — | — | — | — |
| N/C "¼" RS (nitrocellulose) | — | — | — | — | — | — | — | — | — | — |
| SMA 1000A (styrene-maleic anhydride) | — | — | — | — | — | — | — | — | — | — |
| Trimethylolpropane triacrylate | 40 | 30 | 40 | 30 | 40 | 30 | 40 | 30 | 40 | 30 |
| Vinyl acetate | 40 | 30 | 40 | 30 | 40 | 30 | 40 | 30 | 40 | 30 |
| Benzoin ethyl ether | 9 | 9 | 9 | 9 | 9 | 9 | 9 | 9 | 9 | 9 |
| Dibutyl tin maleate | 1 | 1 | 1 | 1 | 1 | 1 | 1 | 1 | 1 | 1 |
| Solution Clarity | Milky | Milky | Milky | Clear | Clear | Clear | Milky | Clear | Milky | Clear |
| Whitening Effect | | | | | | | | | | |
| 6 mils | yes | yes | yes | yes | yes | yes | yes | no | yes | yes |
| 3 mils | yes | no | no | no | yes | no | no | no | yes | no |
| 1 mil | yes | no | no | no | no | no | no | no | no | no |
| Whitening Index | | | | | | | | | | |
| 6 mils | 96.9 | 84.1 | 94.7 | 81.8 | 95.9 | 83.7 | 87.5 | 81.1 | 94.8 | 75. |
| 3 mils | 88.6 | — | — | — | — | — | — | — | — | — |
| 1 mil | 83.2 | — | — | — | — | — | — | — | — | — |
| Composition | 19 | 20 | 21 | 22 | 23 | 24 | 25 | 26 | 27 | 28 |
| Pliolite HML (styrene-acrylate) | — | — | — | — | — | — | — | — | — | — |
| Pliolite VTL (vinyl-toluene-butadiene) | — | — | — | — | — | — | — | — | — | — |
| Pliolite ACL (styrene-acrylate) | — | — | — | — | — | — | — | — | — | — |
| Pliolite S5A (styrene-butadiene) | — | — | — | — | — | — | — | — | — | — |
| Pliolite S5E (styrene-butadiene) | — | — | — | — | — | — | — | — | — | — |
| Chlorowax 70 (chlorinated paraffin, 70%) | 10 | 30 | — | — | — | — | — | — | — | — |
| Acryloid B-66 (acrylic) | — | — | 10 | 30 | — | — | — | — | — | — |
| Parlon S-5 (chlorinated rubber) | — | — | — | — | 10 | 30 | — | — | — | — |
| Vitel PE-100 (polyester) | — | — | — | — | — | — | 10 | 30 | — | — |
| Vitel PE-200 (polyester) | — | — | — | — | — | — | — | — | 10 | 30 |
| AYAC (polyvinyl acetate) | — | — | — | — | — | — | — | — | — | — |
| VMCC (polyvinyl chloride) | — | — | — | — | — | — | — | — | — | — |
| QYOH (polyvinyl chloride) | — | — | — | — | — | — | — | — | — | — |
| Saran F-310 (polyvinylidene chloride) | — | — | — | — | — | — | — | — | — | — |
| Unirez 7003 (maleic rosin ester) | — | — | — | — | — | — | — | — | — | — |
| RJ-100 (styrene-allyl alcohol) | — | — | — | — | — | — | — | — | — | — |
| 18-290 (polystyrene) | — | — | — | — | — | — | — | — | — | — |
| Pentalyn K (rosin ester) | — | — | — | — | — | — | — | — | — | — |
| N/C "¼" RS (nitrocellulose) | — | — | — | — | — | — | — | — | — | — |
| SMA 1000A (styrene-maleic anhydride) | — | — | — | — | — | — | — | — | — | — |
| Trimethylolpropane triacrylate | 40 | 30 | 40 | 30 | 40 | 30 | 40 | 30 | 40 | 30 |
| Vinyl acetate | 40 | 30 | 40 | 30 | 40 | 30 | 40 | 30 | 40 | 30 |
| Benzoin ethyl ether | 9 | 9 | 9 | 9 | 9 | 9 | 9 | 9 | 9 | 9 |
| Dibutyl tin maleate | 1 | 1 | 1 | 1 | 1 | 1 | 1 | 1 | 1 | 1 |

TABLE III-continued

| Solution Clarity | Cloudy | Cloudy | Clear | Clear | Clear | Clear | No Solution | No Solution | No Solution | No Solution |
|---|---|---|---|---|---|---|---|---|---|---|
| Whitening Effect | | | | | | | | | | |
| 6 mils | no | no | yes | no | yes | no | no | no | no | no |
| 3 mils | no | no | yes | no | yes | no | no | no | no | no |
| 1 mil | no | no | no | no | no | no | no | no | no | no |
| Whitening Index | | | | | | | | | | |
| 6 mils | — | — | 89.2 | — | 88.1 | — | — | — | — | — |
| 3 mils | — | — | 76.1 | — | 74.2 | — | — | — | — | — |
| 1 mil | — | — | — | — | — | — | — | — | — | — |

| Composition | 29 | 30 | 31 | 32 | 33 | 34 | 35 | 36 | 37 | 38 |
|---|---|---|---|---|---|---|---|---|---|---|
| Pliolite HML (styrene-acrylate) | — | — | — | — | — | — | — | — | — | — |
| Pliolite VTL (vinyl-toluene-butadiene) | — | — | — | — | — | — | — | — | — | — |
| Pliolite ACL (styrene-acrylate) | — | — | — | — | — | — | — | — | — | — |
| Pliolite S5A (styrene-butadiene) | — | — | — | — | — | — | — | — | — | — |
| Pliolite S5E (styrene-butadiene) | — | — | — | — | — | — | — | — | — | — |
| Chlorowax 70 (chlorinated paraffin, 70%) | — | — | — | — | — | — | — | — | — | — |
| Acryloid B-66 (acrylic) | — | — | — | — | — | — | — | — | — | — |
| Parlon S-5 (chlorinated rubber) | — | — | — | — | — | — | — | — | — | — |
| Vitel PE-100 (polyester) | — | — | — | — | — | — | — | — | — | — |
| Vitel PE-200 (polyester) | — | — | — | — | — | — | — | — | — | — |
| AYAC (polyvinyl acetate) | 10 | 30 | — | — | — | — | — | — | — | — |
| VMCC (polyvinyl chloride) | — | — | 10 | 30 | — | — | — | — | — | — |
| QYOH (polyvinyl chloride) | — | — | — | — | 10 | 30 | — | — | — | — |
| Saran F-310 (polyvinylidene chloride) | — | — | — | — | — | — | 10 | 30 | — | — |
| Unires 7003 (maleic rosin ester) | — | — | — | — | — | — | — | — | 10 | 30 |
| RJ-100 (styrene-allyl alcohol) | — | — | — | — | — | — | — | — | — | — |
| 18-290 (polystyrene) | — | — | — | — | — | — | — | — | — | — |
| Pentalyn K (rosin ester) | — | — | — | — | — | — | — | — | — | — |
| N/C "¼" RS (nitrocellulose) | — | — | — | — | — | — | — | — | — | — |
| SMA 1000A (styrene-maleic anhydride) | — | — | — | — | — | — | — | — | — | — |
| Trimethylolpropane triacrylate | 40 | 30 | 40 | 30 | 40 | 30 | 40 | 30 | 40 | 30 |
| Vinyl acetate | 40 | 30 | 40 | 30 | 40 | 30 | 40 | 30 | 40 | 30 |
| Benzoin ethyl ether | 9 | 9 | 9 | 9 | 9 | 9 | 9 | 9 | 9 | 9 |
| Dibutyl tin maleate | 1 | 1 | 1 | 1 | 1 | 1 | 1 | 1 | 1 | 1 |
| Solution Clarity | Clear | Clear | Clear | Clear | Milky | Milky | No Solution | No Solution | Clear | Clear |
| Whitening Effect | | | | | | | | | | |
| 6 mils | yes | no | yes | no | no | no | no | no | no | no |
| 3 mils | yes | no | yes | no | no | no | no | no | no | no |
| 1 mil | no | no | no | no | no | no | no | no | no | no |
| Whitening Index | | | | | | | | | | |
| 6 mils | 92.8 | — | 84.2 | — | — | — | — | — | — | — |
| 3 mils | 78.2 | — | 71.8 | — | — | — | — | — | — | — |
| 1 mil | — | — | — | — | — | — | — | — | — | — |

| Composition | 39 | 40 | 41 | 42 | 43 | 44 | 45 | 46 | 47 | 48 |
|---|---|---|---|---|---|---|---|---|---|---|
| Pliolite HML (styrene-acrylate) | — | — | — | — | — | — | — | — | — | — |
| Pliolite VTL (vinyl-toluene-butadiene) | — | — | — | — | — | — | — | — | — | — |
| Pliolite ACL (styrene-acrylate) | — | — | — | — | — | — | — | — | — | — |
| Plioloite S5A (styrene-butadiene) | — | — | — | — | — | — | — | — | — | — |
| Pliolite S5E (styrene-butadiene) | — | — | — | — | — | — | — | — | — | — |
| Chlorowax 70 (chlorinated paraffin, 70%) | — | — | — | — | — | — | — | — | — | — |
| Acryloid B-66 (acrylic) | — | — | — | — | — | — | — | — | — | — |
| Parlon S-5 (chlorinated rubber) | — | — | — | — | — | — | — | — | — | — |
| Vitel PE-100 (polyester) | — | — | — | — | — | — | — | — | — | — |
| Vitel PE-200 (polyester) | — | — | — | — | — | — | — | — | — | — |
| AYAC (polyvinyl acetate) | — | — | — | — | — | — | — | — | — | — |
| VMCC (polyvinyl chloride) | — | — | — | — | — | — | — | — | — | — |
| QYOH (polyvinyl chloride) | — | — | — | — | — | — | — | — | — | — |
| Saran F-310 (polyvinylidene chloride) | — | — | — | — | — | — | — | — | — | — |
| Unirex 7003 (maleic rosin ester) | — | — | — | — | — | — | — | — | — | — |
| RJ-100 (styrene-allyl alcohol) | 10 | 30 | — | — | — | — | — | — | — | — |
| 18-290 (polystyrene) | — | — | 10 | 30 | — | — | — | — | — | — |
| Pentalyn K (rosin ester) | — | — | — | — | 10 | 30 | — | — | — | — |
| N/C "¼" RS (nitrocellulose) | — | — | — | — | — | — | 10 | 30 | — | — |
| SMA 1000A (styrene-maleic anhydride) | — | — | — | — | — | — | — | — | 10 | 30 |
| Trimethylolpropane triacrylate | 40 | 30 | 40 | 30 | 40 | 30 | 40 | 30 | 40 | 30 |
| Vinyl acetate | 40 | 30 | 40 | 30 | 40 | 30 | 40 | 30 | 40 | 30 |
| Benzoin ethyl ether | 9 | 9 | 9 | 9 | 9 | 9 | 9 | 9 | 9 | 9 |
| Dibutyl tin maleate | 1 | 1 | 1 | 1 | 1 | 1 | 1 | 1 | 1 | 1 |
| Solution Clarity | Clear | Clear | No Solu- | No Solu- | No Solu- | No Solu- | Clear | No Solu- | No Solu- | No Solu- |

TABLE III-continued

|  | tion | tion | tion | tion |  | tion | tion | tion |
|---|---|---|---|---|---|---|---|---|
| Whitening Effect | | | | | | | | |
| 6 mils | no | no | no | no | no | no | no | no | no | no |
| 3 mils | no | no | no | no | no | no | no | no | no | no |
| 1 mil | no | no | no | no | no | no | no | no | no | no |
| Whitening Index | | | | | | | | | | |
| 6 mils | — | — | — | — | — | — | — | — | — | — |
| 3 mils | — | — | — | — | — | — | — | — | — | — |
| 1 mil | — | — | — | — | — | — | — | — | — | — |

| Composition | 49 | 50 | 51 | 52 | 53 | 54 | 55 | 56 | 57 | 58 |
|---|---|---|---|---|---|---|---|---|---|---|
| 50-42 (polyvinyl alcohol) | 10 | 30 | — | — | — | — | — | — | — | — |
| Cellulose acetate propionate | — | — | 10 | 30 | — | — | — | — | — | — |
| Cellulose acetate butyrate | — | — | — | — | 10 | 30 | — | — | — | — |
| Shellac | — | — | — | — | — | — | 10 | 30 | — | — |
| Epon 1001 (epoxy-bis A) | — | — | — | — | — | — | — | — | 10 | 30 |
| Estane 5715 (polyurethane) | — | — | — | — | — | — | — | — | — | — |
| Estane 5703 (polyurethane) | — | — | — | — | — | — | — | — | — | — |
| Estane 5707F-1 (polyurethane) | — | — | — | — | — | — | — | — | — | — |
| Estane 5714F-1 (polyurethane) | — | — | — | — | — | — | — | — | — | — |
| Estane 5703F-2 (polyurethane) | — | — | — | — | — | — | — | — | — | — |
| Trimethylolpropane triacrylate | 40 | 30 | 40 | 30 | 40 | 30 | 40 | 30 | 40 | 30 |
| Vinyl acetate | 40 | 30 | 40 | 30 | 40 | 30 | 40 | 30 | 40 | 30 |
| Benzoin ethyl ether | 9 | 9 | 9 | 9 | 9 | 9 | 9 | 9 | 9 | 1 |
| Dibutyl tin maleate | 1 | 1 | 1 | 1 | 1 | 1 | 1 | 1 | 1 | 1 |
| Solution Clarity | No Solution | No Solution | Clear | No Solution | Clear | ---------- No Solution ---------- | | | | |
| Whitening Effect | | | | | | | | | | |
| 6 mils | no | no | no | no | no | no | no | no | no | no |
| 3 mils | no | no | no | no | no | no | no | no | no | no |
| 1 mil | no | no | no | no | no | no | no | no | no | no |
| Whitening Index | | | | | | | | | | |
| 6 mils | — | — | — | — | — | — | — | — | — | — |
| 3 mils | — | — | — | — | — | — | — | — | — | — |
| 1 mil | — | — | — | — | — | — | — | — | — | — |

| Composition | 59 | 60 | 61 | 62 | 63 | 64 | 65 | 66 | 67 | 68 |
|---|---|---|---|---|---|---|---|---|---|---|
| 50-42 (polyvinyl alcohol) | — | — | — | — | — | — | — | — | — | — |
| Cellulose acetate propionate | — | — | — | — | — | — | — | — | — | — |
| Cellulose acetate butyrate | — | — | — | — | — | — | — | — | — | — |
| Shellac | — | — | — | — | — | — | — | — | — | — |
| Epon 1001 (epoxy-bis A) | — | — | — | — | — | — | — | — | — | — |
| Estane 5715 (polyurethane) | 10 | 30 | — | — | — | — | — | — | — | — |
| Estane 5703 (polyurethane) | — | — | 10 | 30 | — | — | — | — | — | — |
| Estane 5707F-1 (polyurethane) | — | — | — | — | 10 | 30 | — | — | — | — |
| Estane 5714F-1 (polyurethane) | — | — | — | — | — | — | 10 | 30 | — | — |
| Estane 5703F-2 (polyurethane) | — | — | — | — | — | — | — | — | 10 | 30 |
| Trimethylolpropane triacrylate | 40 | 30 | 40 | 30 | 40 | 30 | 40 | 30 | 40 | 30 |
| Vinyl acetate | 40 | 30 | 40 | 30 | 40 | 30 | 40 | 30 | 40 | 30 |
| Benzoin ethyl ether | 9 | 9 | 9 | 9 | 9 | 9 | 9 | 9 | 9 | 9 |
| Dibutyl tin maleate | 1 | 1 | 1 | 1 | 1 | 1 | 1 | 1 | 1 | 1 |
| Solution Clarity | ---------- No Solution ---------- | | | | | ---------- No Solution ---------- | | | | |
| Whitening Effect | | | | | | | | | | |
| 6 mils | no | no | no | no | no | no | no | no | no | no |
| 3 mils | no | no | no | no | no | no | no | no | no | no |
| 1 mil | no | no | no | no | no | no | no | no | no | no |
| Whitening Index | | | | | | | | | | |
| 6 mils | — | — | — | — | — | — | — | — | — | — |
| 3 mils | — | — | — | — | — | — | — | — | — | — |
| 1 mil | — | — | — | — | — | — | — | — | — | — |

What is claimed is:

1. A light-transmissive coating composition which is ultraviolet radiation curable to a white opaque film comprising (1) between about 5 and 20 weight percent of polyvinyl butyral, (2) between about 35 and 45 weight percent of vinyl acetate, (3) between about 35 and 45 weight percent of polymerizable monomer selected from trimethylolpropane triacrylate and pentaerythritol triacrylate, and (4) between about 1 and 10 weight percent of an ultraviolet-sensitive photoinitiator.

2. A coating composition in accordance with claim 1 wherein the polyvinyl butyral component has an average molecular weight in the range between about 10,000 and 50,000.

3. A coating composition in accordance with claim 1 wherein the polyvinyl butyral component contains less than about 15 percent of free hydroxyl, calculated as weight percent polyvinyl alcohol.

* * * * *